Jan. 17, 1967   C. V. DYE   3,298,728
END GATE THROW LATCH MECHANISMS
Filed June 19, 1964   5 Sheets-Sheet 1

INVENTOR.
CLYDE V. DYE
BY Hamilton & Cook
ATTORNEYS

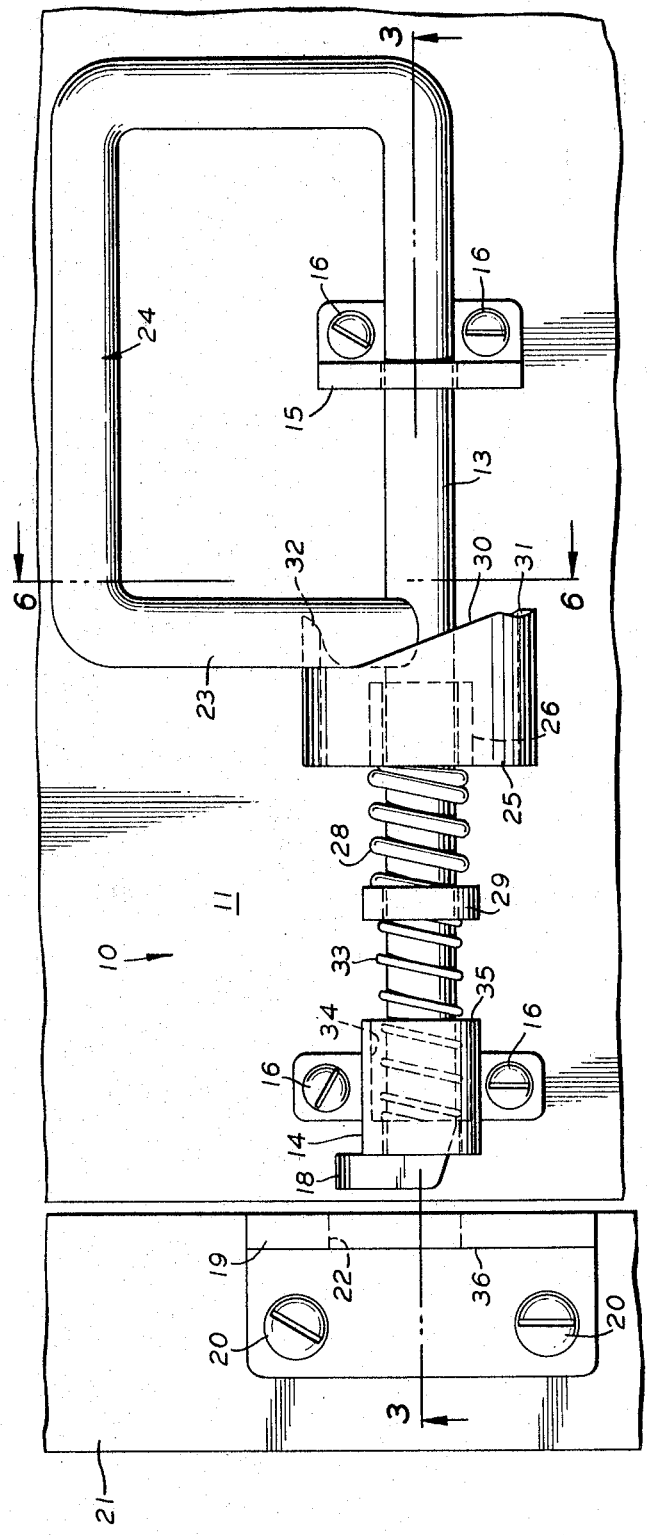
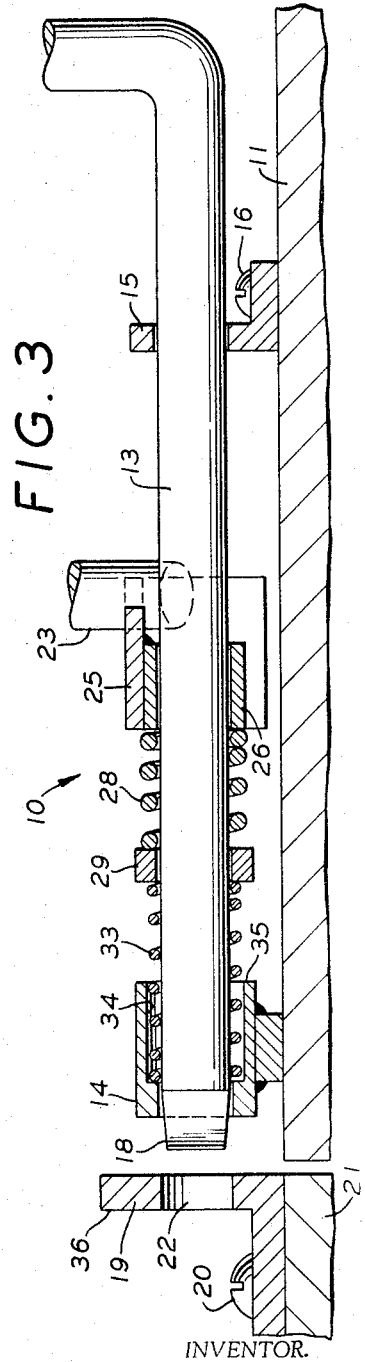

INVENTOR.
CLYDE V. DYE
BY Hamilton & Cook
ATTORNEYS

Jan. 17, 1967     C. V. DYE     3,298,728
END GATE THROW LATCH MECHANISMS
Filed June 19, 1964     5 Sheets-Sheet 4

INVENTOR.
CLYDE V. DYE
BY Hamilton & Cook
ATTORNEYS

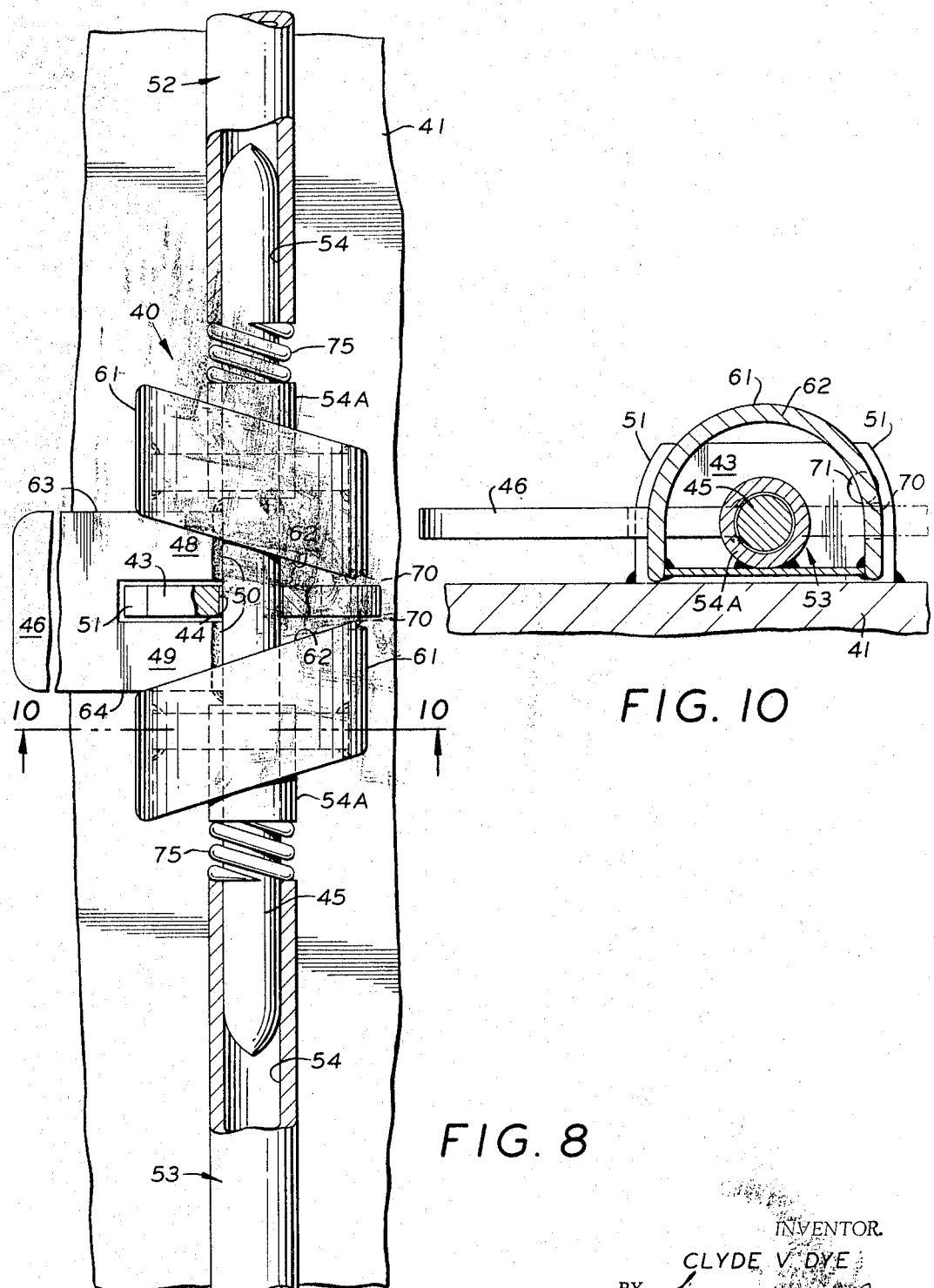

United States Patent Office 3,298,728
Patented Jan. 17, 1967

3,298,728
END GATE THROW LATCH MECHANISMS
Clyde V. Dye, 436 Wildwood Ave., Akron, Ohio 44320
Filed June 19, 1964, Ser. No. 376,532
6 Claims. (Cl. 292—62)

The present invention relates generally to latch mechanisms. More particularly, the present invention relates to an end gate throw latch mechanisms for trucks, trailers and the like.

Trucks, trailers and other loadbearing vehicles almost all utilize an end, or side, gate which is either completely removable or hinged to swing free of the rear, or side, entrance to the bed of the vehicle. These gates in turn employ latch mechanisms to hold them shut. The prior art knowns many forms of latch mechanisms suitable for merely holding such gates selectively in closed position.

However, it has been found that a suitable latch mechanism must do more than merely retain the gate in closed positon. The shifting of loads and the necessity for negotiating loadbearing vehicles over rough roads continuously subjects the vehicle to a racking movement which not only deleteriously effects the frame and body of the vehicle itself but also the gate and its hinge means. The auto industry has noted the adverse effects of continued racking, even to passenger car bodies and frames, and has attempted to solve the problem by such expedients as uni-bodies and welded frames.

It has not been possible, in the past, to fasten the gate of a commercial, loadbearing vehicle to the gate frame with sufficient rigidity so that it will become structurally integral with the rest of the body, through its frame as is required to prevent the damages attendant upon the aforementioned racking.

It is therefore the primary object of the present invention to provide a throw latch mechanism which will prevent the gate fastened thereby from racking.

It is another object of the present invention to provide a throw latch mechanism, as above, which will provide a positive joinder between the gate and the frame to which it is mounted.

It is a further object of the present invention to provide a latch mechanism, as above, which will directly assist the hinge means by which the gate is swung in supporting the weight of the gate fastened thereby.

It is a still further object of the present invention to provide a latch mechanism, as above, which can be manually operated with ease.

It is a still further object of the present invention to provide a latch mechanism, as above, which is inexpensive to manufacture and install and which is durable in use.

These and other objects which will become apparent from the following specification are accomplished by means hereinafter described and claimed.

Two embodiments are shown by way of example in the accompanying drawings and described in detail without attempting to show all of the various forms and modifications in which the invention might be embodied; the invention being measured by the appended claims and not by the details of the specification.

In the drawings:

FIG. 2 is a plan view of the subject latch mechanism in unlocked position;

FIG. 3 is a cross section taken substantially on line 3—3 of FIG. 2;

FIG. 8 is an enlarged area of FIG. 7 depicting the the throw arm, or handle, and the actuating mechanism of the latch in unlocked position;

FIG. 10 is a cross section taken substantially on line 10—10 of FIG. 8.

Figure 1:
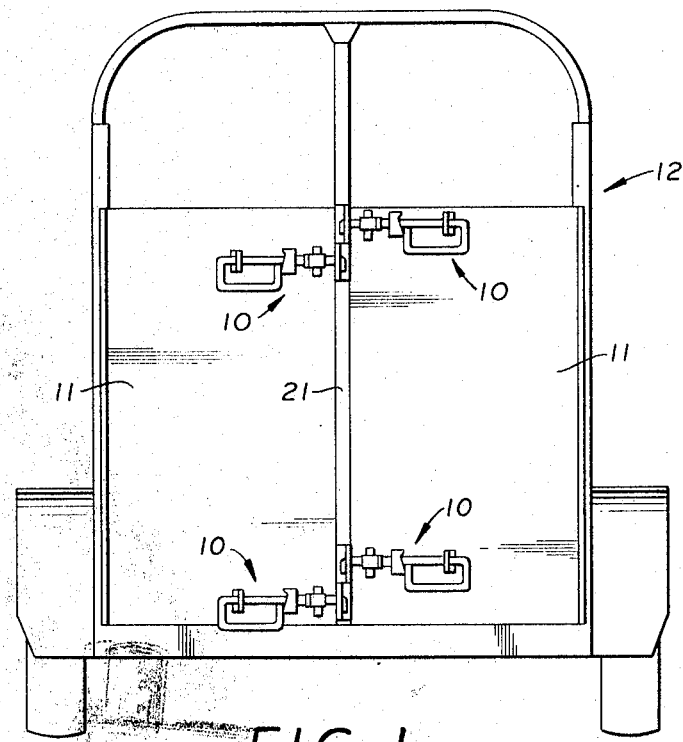
FIG. 1 is a rear elevation of a trailer having vertically hinged end gates fastened by throw latches constructed according to the concept of the present invention.

In general, a latch mechanism according to the present invention utilizes at least one longitudinally slidable lock bolt having a fastening means on one end selectively engageable with a keeper. A semicylindrical cam body having a cam surface angularly oriented with respect to the longitudinal axis of the cam body is positioned radially of the lock bolt, and a spring means biases the cam surface toward a cam follower actuated by a handle. Actuation of the cam, by the cam follower, against the spring means moves the fastening means into and out of locking contact with the keeper.

Referring particularly to the drawings, a plurality of one species of the improved latch mechanism, indicated generally by the numeral 10, is depicted locking a pair of vertically hinged end gates 11 to the body of a typical horse transporting trailer, or vehicle 12. While the latch 10 is shown in conjunction with a horse carrying trailer, and is particularly suited therefor, it must be understood that a latch according to the concept of the present invention is readily adapted for use in any situation where it is desired to lock the door sufficiently tightly to its frame, so that, for all practical purposes, it becomes unitary therewith.

Improved latch 10 has a lock bolt 13 which is slidably and rotatably received in a pair of spaced apart journals 14 and 15, fixed to the end gate 11 as by screws 16, or other suitable means.

A fastening means in the form of a lug 18 extends radially outwardly from one end of the lock bolt 13 for selective engagement with the keeper 19. The keeper 19 is secured, as by screws 20, to the jamb or frame, 21 of the gate 11 and is provided with a keyhole 22 through which the lug 18 can be insertably received. Of course, the keeper can be formed integral with, and be a part of, the jamb, as for example, if the jamb were a hollow steel structural member.

A cam follower 23 is attached to and extends radially outwardly of the lock bolt 13, and may, as shown, be formed as an integral part of the handle 24 by which the sliding and rotation of the lock bolt 13 is actuated.

Figure 6:
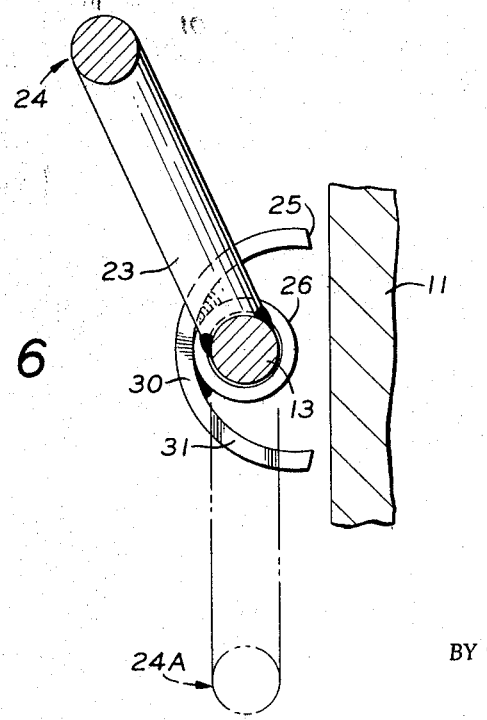
FIG. 6 is a cross section taken substantially on line 6—6 of FIG. 2.

A generally semicylindrical cam body 25 is mounted concentrically of the lock bolt 13 between the fixed journal 14 and the cam follower 23. While the semicylindrical cross section of the cam body 25 is preferred, the cam body could as well be constructed in another, or similar, geometric shape, and still be within the scope of the present invention. This cam body 25 is floatingly—i.e., at least slidingly and permissibly to a limited degree rotatably—mounted on the lock bar 13, as by the bushing 26. The limited rotation permitted to the cam body 25 facilitates grasping of the handle 24 when positioned in the chain line location 24A depicted in FIG. 6. The necessary slidability effects the high pressure locking contact of the lug 18 with the keeper 19 when the cam body 25 is forced against the biasing pressure of the compression spring 28 by actuation of the handle 24. Specifically, the compression spring 28 acts between an anchor means (which may be comprised of the journal 14 and the collar 29) and the cam body 25 to bias the cam surface 30 on cam body 25 toward the cam follower 23. The profile of the cam surface 30, as shown in the plan representation, is angularly oriented transversely the axis of the cam body 25, the axis of the cam body 25 being generally coincident with the longitudinal axis of the lock bolt 13, at an angle of approximately 18° to a plane transversely of said axes. A stop notch 31 is provided at one end of said cam surface to receive and retain the cam follower 23 selectively at that position. In the embodiment depicted in FIGS. 1–6, a stop shoulder 32 is shown at the other end of the cam surface 30 to limit the degree of angular rotation through which the cam follower 23 may be moved. However, in some applications it may be desirable to eliminate this stop shoulder 32.

The journal 14 and the collar 29 which together comprise the anchor means for the compression spring 28 are themselves the opposing anchors of a second compression spring means 33. The journal 14 includes a sleeve portion having a bore 34 concentric of and spaced radially outwardly from the lock bolt 13 into which the second spring 33 can be completely received when compressed. The collar 29 is slidable axially along the lock bolt 13 and is engaged on one side by the first spring means 28 and engaged on the other side by the second spring means 33.

To operate the latch 10 from the unlocked position represented in FIG. 2 the handle 24 is grasped and the lock bolt 13, with the cam follower 23 retained against the axially innermost end of the cam surface 30, viz., against the stop shoulder 32, is moved axially until the lug 18 is inserted through the keyhole 22. The first spring 28 is relatively heavy, or stiff, as compared to the weak, or more resilient second spring 33. That is, the spring coefficient, as determined by Hooke's law, is greater for the first spring 28 than the second spring 33. Thus, because of the greater deflection of the second spring 33 for a given load than for the first spring 28, the lug 18 will be moved through the keyhole 22 against the yielding pressure of the second spring 33 with the length of the first spring remaining substantially unchanged. See the chain line position of the lug designated as 18A in FIGS. 4 and 5.

Preferably, the dimensions of the springs and their relative coefficients are such that as soon as the lug 18 moves through the keyhole 22 the collar 29 will abut the terminal face 35 on the sleeve portion of the fixed journal 14, thus completing the axial extent of compression of the second spring 33.

Figure 4:
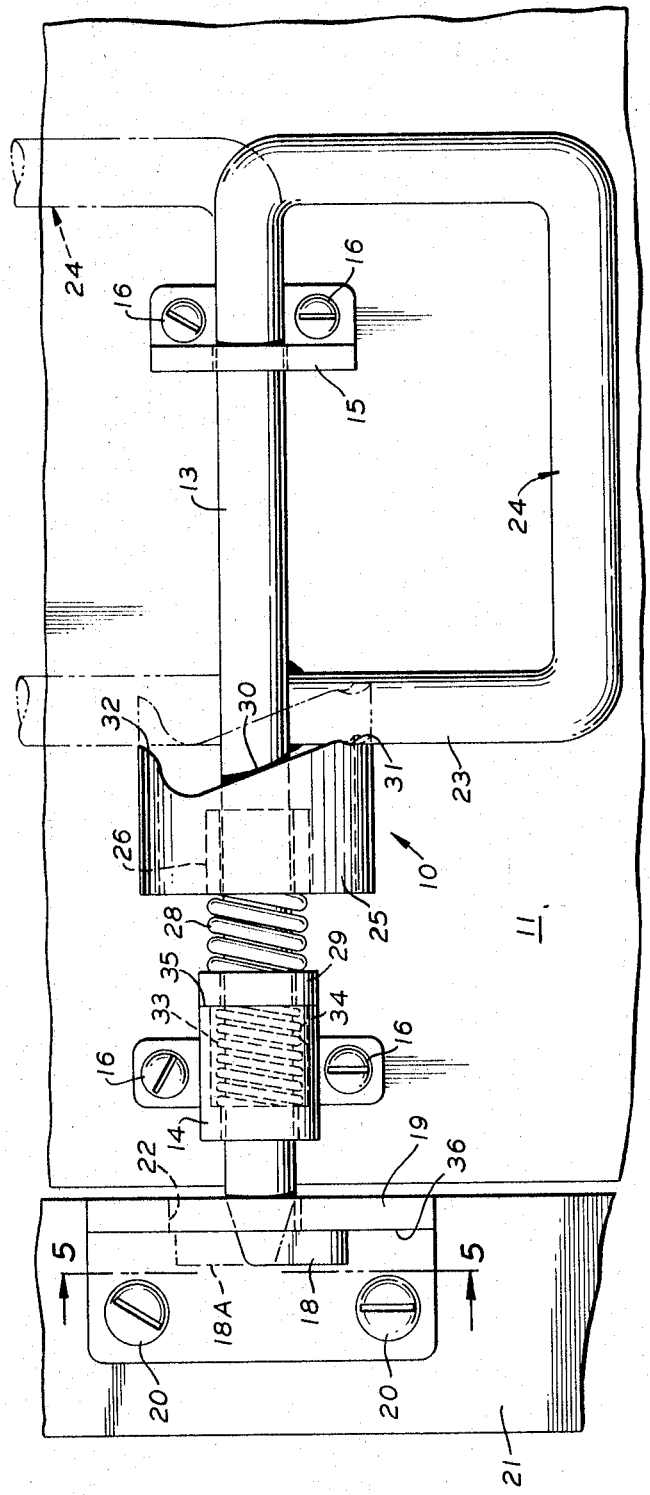
FIG. 4 is a view similar to FIG. 2 depicting the latch closed, in chain line, and thrown, locked, in full line representation.
Figure 5:
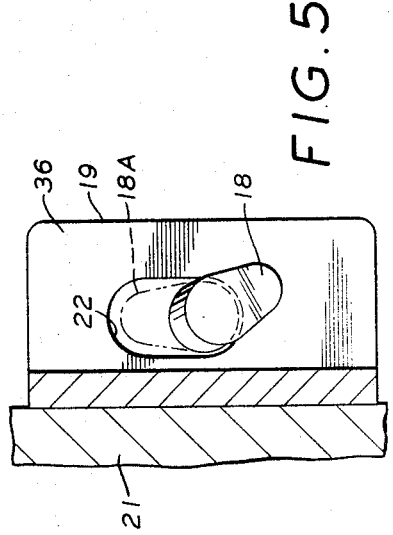
FIG. 5 is a cross section taken substantially on line 5—5 of FIG. 4 showing the latch keeper in elevation.
Figure 7:
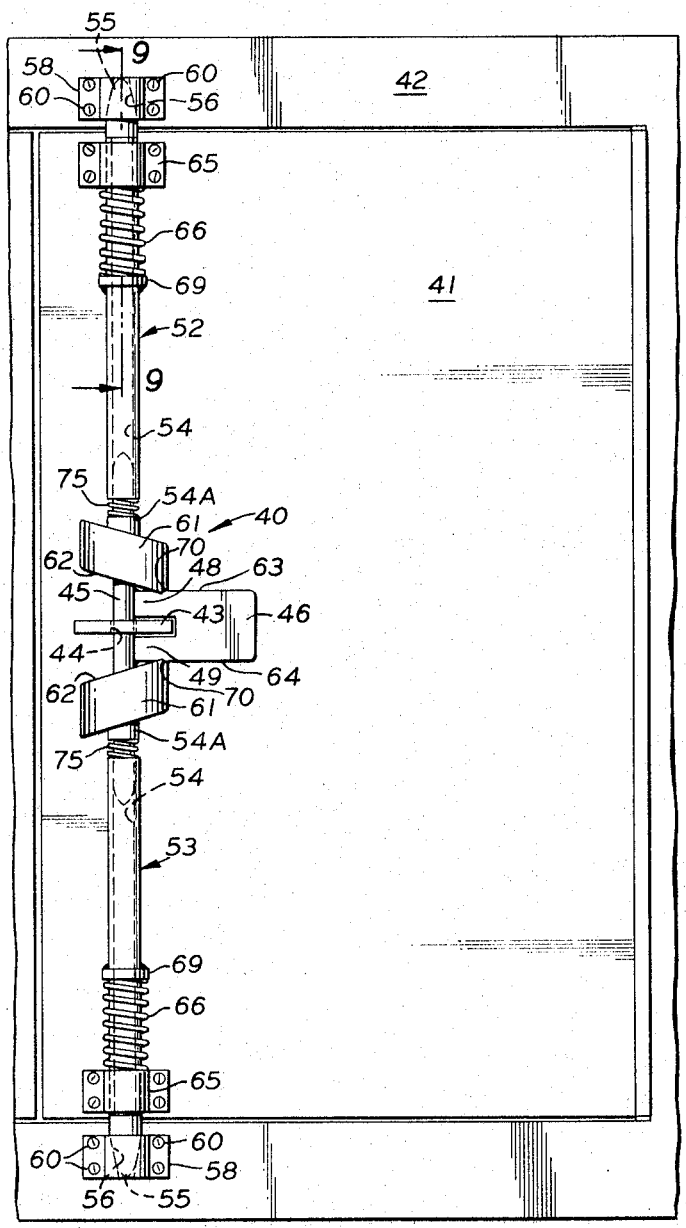
FIG. 7 is a partial side elevation of a trailer having a vertically hinged side gate fastened by a second form of latch mechanism according to the present invention.
Figure 9:
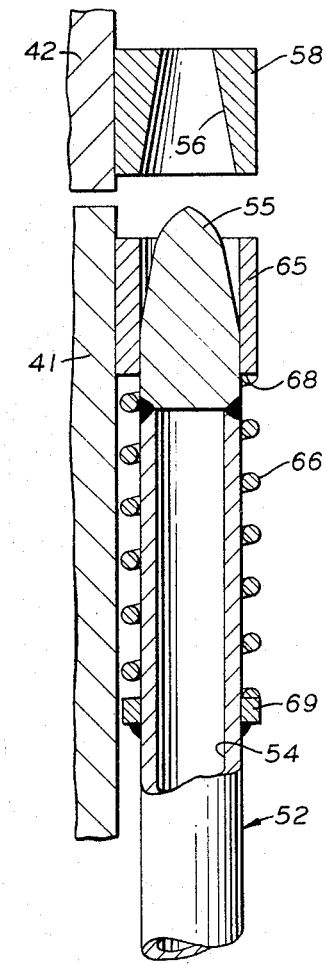
FIG. 9 is an enlarged cross section taken substantially on line 9—9 of FIG. 7 depicting the interfitting lock bolt and keeper.

The relative position of the elements at this stage of the latch mechanism are depicted in the phantom representation in FIG. 4.

The locking operation is completed from the phantom representation in FIG. 4 by rotation of the lock bolt 13 through manipulation of handle 24 so that the cam follower 23 traverses the cam surface 30. During this rotation of the lock bolt 13 the lug 18 swings out of alignment with the key-hole 22 into engagement with the keeper 19, i.e., the rear surface 36 thereof. See the solid line representation of lug 18 in FIGS. 4 and 5. Simultaneously, the interaction between the cam follower 23 and the cam surface 30 forces the floating cam body toward the collar 29, compressing the first spring 29 therebetween. This compressive force can readily be of a magnitude sufficient to lock the gate unitarily to the frame in which it is mounted because of the extremely high mechanical advantage obtained by the unique latch mechanism.

As an example of this high mechanical advantage, if the radius of the cam follower 23 is 2″ to its outer point of contact with the cam surface 30 on cam body 25, the radius of the handle 24 is 5″, the profile of the cam surface 30 is oriented at an angle of 18° from a plane transversely the longitudinal axis of the cam body 25, and the handle is capable of a throw angle of approximately 155°, the mechanical advantage of the handle to the cam follower is about 2.5, the mechanical advantage of the cam itself is about 6, and the combined mechanical advantage is the product of the individual mechanical advantages of the cam itself and the handle, or about 15. Accordingly, a force of 40 pounds applied to rotate the handle results in an available force of 600 pounds to compress the heavy duty first spring 29 approximately 0.9 of an inch. By the application of Newton's third law of motion that for every action, or force, there is an equal and opposite reaction, one can readily determine that this 600 pound force can compress a spring offering 600 pounds of resistance through 0.9 of an inch and the lug 18, in such a situation, will lockingly engage the keeper 19 with an equal force of 600 pounds.

The species depicted in FIGS. 7–10, and identified generally by the numeral 40, operates in a similar fashion. The latch 40 is shown locking a hinged side door 41 to the frame 42 of a vehicle. A fixed mounting base 43 in the form of an upstanding plate is affixed to the door 41, as by welding or other suitable means. A bore 44 is provided transversely through the base 43 which rotatably receives a guide rod 45.

A handle 46 is bifurcated at one end to present two spaced apart legs 48 and 49 which straddle the mounting base 43 and are themselves securely fastened to the guide rod 45, as by welding 50. With the bifurcated end of the handle 46 thus straddling the mounting base 43, the guide rod is prevented from moving axially of itself through the base 43.

The mounting base 43 has rounded outer corners 51, as best seen in FIG. 10, so as not to interfere with the swinging movement of the handle 46 about the axis of, and with, the guide rod 45.

A pair of lock bolts 52 and 53 each have a hollow shaft portion 54 which is slidably mounted over the ends of the guide rods 45 extending outwardly from the mounting base 43 in opposed directions so that the lock bolts 52 and 53 are axially aligned with their fastening heads 55 directed in opposed relation. The fastening head 55 on each lock bolt 52 and 53 comprises a generally bullet-shaped portion which is matingly engageable in a recess 56 in the keeper means 58 on the frame 42 in which the door 49 is mounted. The keeper means 58 may be a separate item attached to the frame, as by the screws 60 shown, or may comprise a mating recess formed into the frame itself.

On the end of each lock bolt 52 and 53 opposite from the fastening head 55 is secured a cam body 61. The cam body is preferably semicylindrical and is positioned concentrically of the lock bolt on which it is mounted. Each cam body 61 has a cam surface 62 which is angularly oriented transversely the axis of the cam body, generally coincident with the longitudinal axis of the lock bolts. The profile of the cam surface 62 is oriented preferably at an angle of approximately 18° to a plane transversely of said axes, or at least at an angle which is capable of effecting the required throw, or axial translation, of the lock bolts.

As best shown in FIG. 8, the cam surface 62 on each cam body 61 lies in opposed and mirrored relation to the cam surface on the other cam body. The edges 63 and 64 of the handle 46 comprise the cam followers—edge 63 being the cam follower for the cam secured to lock bolt 52, and the edge 64 being the cam follower for the cam secured to the lock bolt 53.

Each lock bolt 52 and 53 is slidably received in a fixed journal 65 and carries a comparatively light compression spring 66 which encircles the lock bolt and extends between the terminal face 68 on journal 65 and a collar 69 fixed to and extending radially outwardly of the lock bolt.

To lock latch 40 the handle 46 is rotated about the axis of the guide rod 45 so that the two cam followers 63 and 64 engage and transverse the cam surfaces 62 and the cam bodies 61 secured to the respective lock bolts 52 and 53. This drives the fastening heads 55 into their mating keeper recesses 56 with a force equal to the force applied to the handle 46 times the mechanical advantage of the latch mechanism, as in the first species described in detail above.

Similarly also, a stop notch 70 should be provided at one end of each of the cam surfaces 62 to receive and retain the handle 46 in the locked position.

A bore 71 may be propitiously located transversely through the mounting base 43 to receive a padlock when it is desired to assure that no one authorized person will open the latch.

To unlock the door, the handle 46, as in the first species, is reversely rotated, and the light springs 66 assure that the fastening heads 55 retract and remain fully retracted so as not to interfere with the free opening and closing movements of the door 41.

Because of the extremely high locking forces available with the latch mechanism constructed according to the concept of the present invention, it may be desirable to utilize a safety latch spring 75 in conjunction with latch mechanism 40.

As shown in FIG. 8, the shaft portion 54 may be transversely parted within the extent of the guide rod 45 so that a spring 75 can be inserted between the main portion of the shaft 54 and the sleeve 54A parted therefrom. Thus, if the keeper is partially obstructed, the extremely large locking force which moves the fastening head 55 into the recess 56 and keeper 58 can be partially alleviated by the compression of the heavy duty safety spring 75.

It should, therefore, be apparent that a latch mechanism constructed according to the concept of the present invention not only provides a positive joinder between the gate, or door, and the frame in which it is mounted to prevent it from racking but also accomplishes the other objects of the invention.

What is claimed is:

1. A latch mechanism comprising, an axially slidable and rotatable lock bolt, a handle to slide and rotate said lock bolt, a fastening means on one end of said lock bolt, a keeper selectively engaged by said fastening means, a semicylindrical cam body, said cam body floatingly mounted concentrically of said lock bolt and having a cam surface angularly oriented generally transversely of the axis of said cam body, a cam follower fixedly mounted on said lock bolt and actuated by said handle, spring means biasing said cam surface toward said cam follower, actuation of said cam against said spring means moving said fastening means into and out of locking contact with said keeper.

2. A latch mechanism comprising, an axially slidable and rotatable lock bolt, a handle to slide and rotate said lock bolt, a fastening means on one end of said lock bolt, a keeper selectively engaged by said fastening means, a semicylindrical cam body, said cam body floatingly mounted concentrically of said lock bolt and having a cam surface angularly oriented generally transversely of the axis of said cam body, a cam follower fixedly mounted on said lock bolt and actuated by said handle, anchor means positioned between said fastening means and said cam body, said lock bolt slidable axially with respect to said anchor means, a compression spring means acting between said anchor means and said cam body to bias said cam surface toward said cam follower, actuation of said cam against said spring means moving said fastening means into and out of locking contact with said keeper.

3. A latch mechanism comprising, an axially slidable and rotatable lock bolt, a lug extending radially outwardly from one end of said lock bolt, a handle to slide and rotate said lock bolt, a keeper, said keeper having a keyhole slot, said lug selectively insertable through said keyhole slot and engageable behind said keeper, a cam follower fixedly mounted on and extending radially of said lock bolt, a semicylindrical cam body, said cam body floatingly mounted concentrically of said lock bolt between said lug and said cam follower, a cam surface on said cam body angularly oriented generally transversely the axis of said cam body, anchor means positioned between said lug and said cam body, said lock bolt slidable axially with respect to said anchor means, a compression spring means acting between said anchor means and said cam body to bias said cam surface toward said cam follower, actuation of said cam body against said spring means by rotation of said lock bolt moving the cam follower against said cam surface moving said lug into locking engagement with said keeper.

4. A latch mechanism, as set forth in claim 3, in which the anchor means comprises a fixed journal in which said lock bolt is slidably and rotatably received and a collar slidably mounted on said lock bolt between said journal and said cam body, a first, relatively heavy, compression spring means between said collar and said cam body and a second, relatively light, compression spring means between said collar and said journal.

5. A latch mechanism, as set forth in claim 4, in which said collar abuts said journal upon compression of said second spring means and prior compression of said first spring means.

6. A latch mechanism, as set forth in claim 5, in which the profile of the cam surface is angularly oriented at approximately 18° to a plane transversely of the axis of said semicylindrical cam body.

References Cited by the Examiner

UNITED STATES PATENTS

| 797,403 | 8/1905 | Code | 292—57 |
| 1,723,007 | 8/1929 | Bittorf | 292—61 |
| 1,871,633 | 8/1932 | Meer | 292—169 |
| 2,143,626 | 1/1939 | Jones | 292—58 X |
| 2,403,065 | 7/1946 | Engert | 292—57 |
| 2,922,297 | 1/1960 | Hitzelberger | 292—169 X |
| 3,126,217 | 3/1964 | Russel et al. | 292—169 X |

FOREIGN PATENTS 589,604   2/1925   France.

EDWARD C. ALLEN, *Primary Examiner.*

J. R. MOSES, *Assistant Examiner.*